(12) United States Patent
Koba et al.

(10) Patent No.: US 11,897,727 B2
(45) Date of Patent: Feb. 13, 2024

(54) ELEVATOR CONTROL DEVICE AND AUTONOMOUS MOVING BODY CONTROL DEVICE

(71) Applicant: Mitsubishi Electric Corporation, Tokyo (JP)

(72) Inventors: Yoshimasa Koba, Tokyo (JP); Shingo Kobori, Tokyo (JP); Takahide Hirai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1338 days.

(21) Appl. No.: 16/311,171

(22) PCT Filed: Oct. 4, 2016

(86) PCT No.: PCT/JP2016/079446
§ 371 (c)(1),
(2) Date: Dec. 19, 2018

(87) PCT Pub. No.: WO2018/066054
PCT Pub. Date: Apr. 12, 2018

(65) Prior Publication Data
US 2019/0218060 A1    Jul. 18, 2019

(51) Int. Cl.
*B66B 1/02* (2006.01)
*B66B 1/34* (2006.01)
(Continued)

(52) U.S. Cl.
CPC ............. *B66B 3/02* (2013.01); *B66B 1/3492* (2013.01); *G05D 1/02* (2013.01); *B66B 1/06* (2013.01); *B66B 2201/30* (2013.01)

(58) Field of Classification Search
CPC ............ B66B 1/3492; B66B 3/00–004; B66B 11/006; B66B 2201/20; B66B 2201/21; B66B 2201/23; B66B 2201/4653
See application file for complete search history.

(56) References Cited

U.S. PATENT DOCUMENTS

| 4,279,563 A | 7/1981 | Miller |
| 8,958,910 B2 * | 2/2015 | Ichinose ............... B66B 1/2458 700/258 |

(Continued)

FOREIGN PATENT DOCUMENTS

| JP | S59-167465 A | 9/1984 |
| JP | 2005-206362 A | 8/2005 |

(Continued)

OTHER PUBLICATIONS

International Search Report and Written Opinion of the International Searching Authority for International Application No. PCT/JP2016/079446 dated Jan. 10, 2017 (with English Translation).

(Continued)

*Primary Examiner* — Christopher Uhlir
(74) *Attorney, Agent, or Firm* — XSENSUS LLP

(57) ABSTRACT

Provided is an elevator control device capable of calling attention to contact between a user and an autonomous moving body in an elevator shared by the user and the autonomous moving body. The elevator control device includes an elevator notification control unit configured to causes, based on a call for an elevator from an autonomous moving body, equipment provided in a hall of the elevator of a floor on which the autonomous moving body is present or equipment provided in a car of the elevator to provide notification of information indicating that the autonomous moving body boards or disembarks from the car.

16 Claims, 9 Drawing Sheets

(51) Int. Cl.
*B66B 3/02* (2006.01)
*G05D 1/02* (2020.01)
*B66B 1/06* (2006.01)

(56) References Cited

U.S. PATENT DOCUMENTS

| | | | |
|---|---|---|---|
| 10,183,836 B2 * | 1/2019 | Siikonen | ............... B66B 1/2466 |
| 2012/0041593 A1 | 2/2012 | Ichinose et al. | |

FOREIGN PATENT DOCUMENTS

| | | |
|---|---|---|
| JP | 2011-88721 A | 5/2011 |
| JP | 2012-17184 A | 1/2012 |
| JP | 2013-71842 A | 4/2013 |

OTHER PUBLICATIONS

English-language translation of International Search Report for International Application No. PCT/JP2016/079446, dated Jan. 10, 2017.

Office Action dated Jan. 29, 2021, in corresponding German patent Application No. 112016007313.5, 11 pages.

* cited by examiner

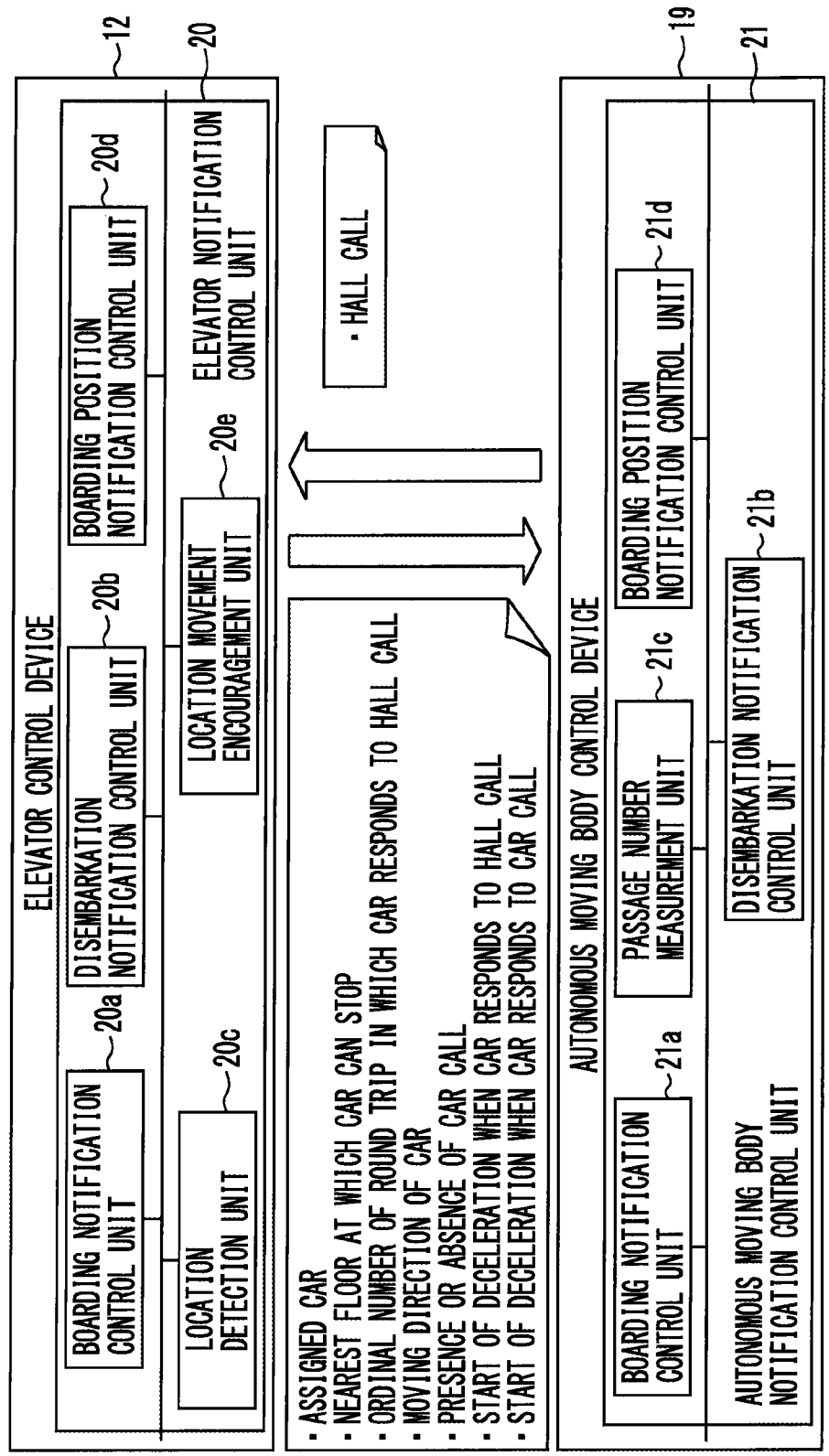

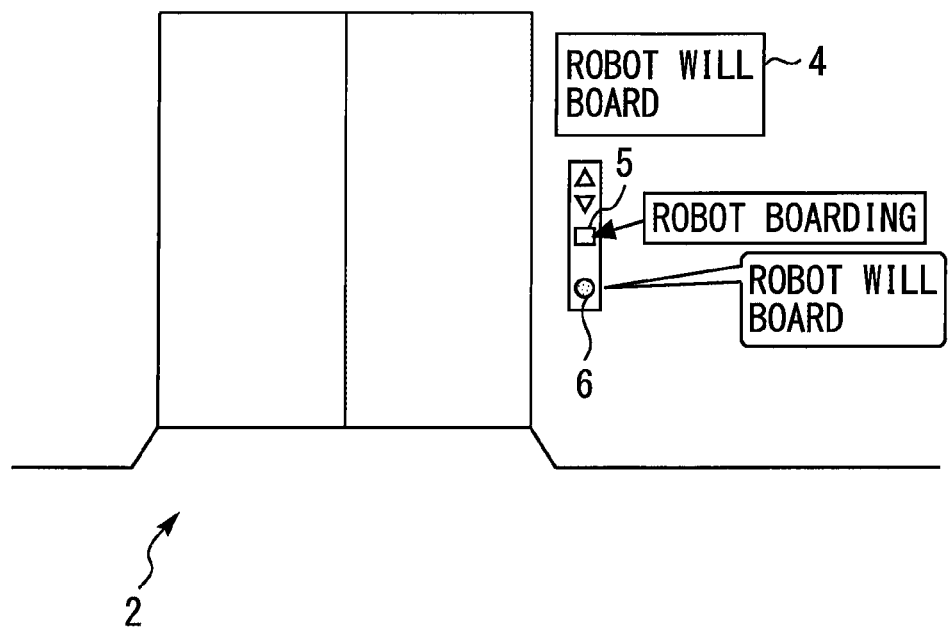
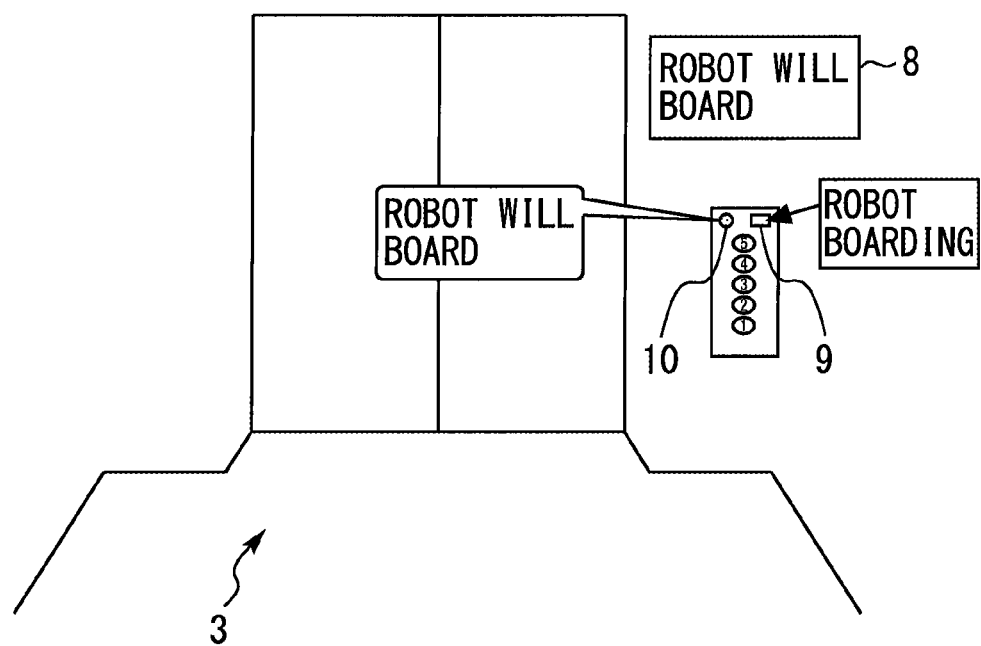

FIG. 13
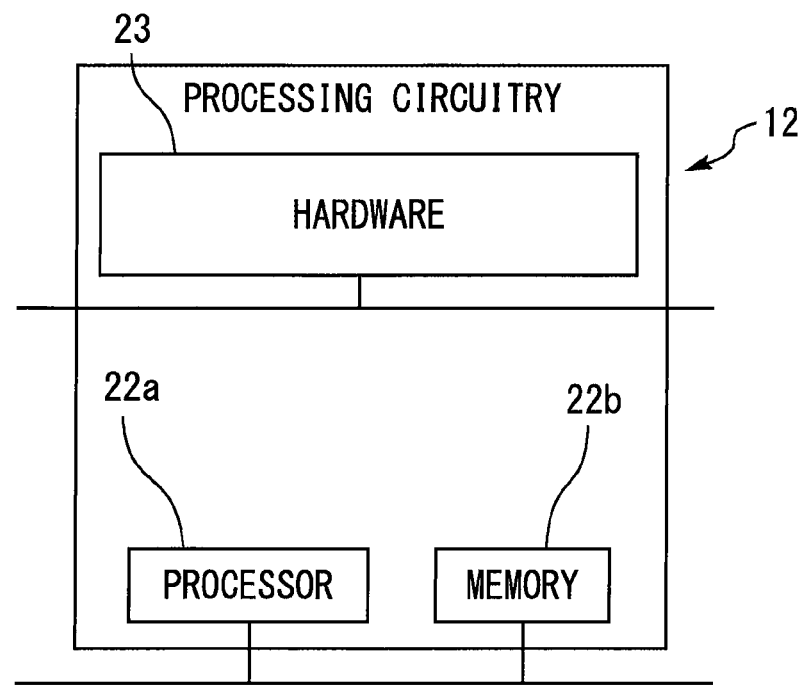
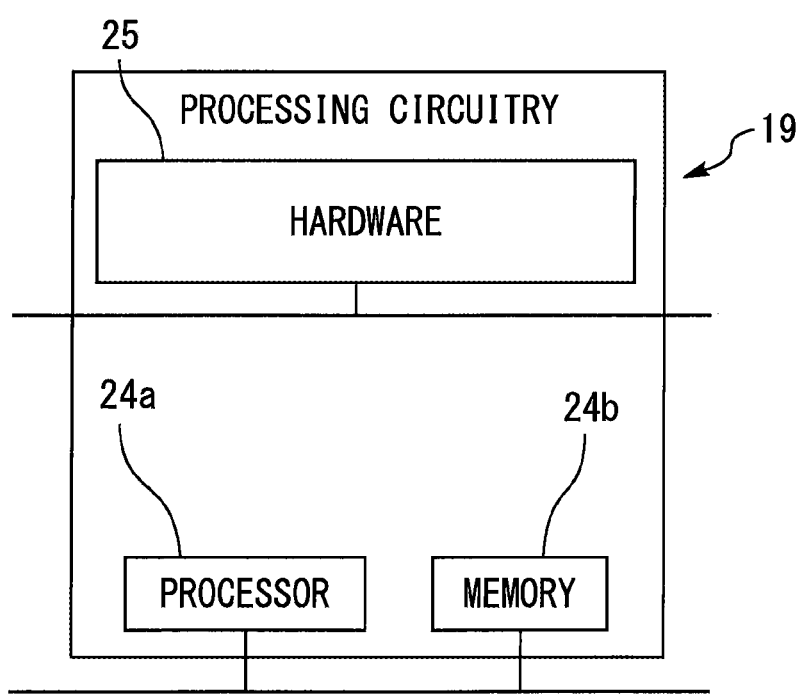

ELEVATOR CONTROL DEVICE AND AUTONOMOUS MOVING BODY CONTROL DEVICE

CROSS-REFERENCE TO RELATED APPLICATIONS

This application is a National Stage Application based on PCT/JP2016/079446, filed on Oct. 4, 2016, the entire contents of which being incorporated herein by reference.

TECHNICAL FIELD

The invention relates to an elevator control device and an autonomous moving body control device.

BACKGROUND ART

PTL 1 discloses, for example, an elevator system. The elevator system provides notification of various pieces of information according to the operation of an elevator.

CITATION LIST

Patent Literature

[PTL 1] Japanese Patent Application Publication No. 2013-71842

SUMMARY OF INVENTION

Technical Problem

In the case where the elevator system described in PTL 1 cooperates with an autonomous moving body system, an autonomous moving body boards and disembarks from an elevator car. Consequently, a user and the autonomous moving body can come into contact with each other.

The invention has been made in order to solve the above problem. An object of the invention is to provide an elevator control device and an autonomous moving body control device capable of calling attention to contact between a user and an autonomous moving body in an elevator shared by the user and the autonomous moving body.

Solution to Problem

An elevator control device according to the invention includes an elevator notification control unit configured to cause, based on a call for an elevator from an autonomous moving body, equipment provided in a hall of the elevator of a floor on which the autonomous moving body is present or equipment provided in a car of the elevator to provide notification of information indicating that the autonomous moving body boards or disembarks from the car.

An autonomous moving body control device according to the invention includes an autonomous moving body notification control unit configured to cause, based on a call for an elevator from a user or an autonomous moving body, equipment provided in the autonomous moving body to provide notification of information indicating that the user or the autonomous moving body boards or disembarks from a car of the elevator.

Advantageous Effects of Invention

According to these aspects of the invention, the notification of the information indicating that the user or the autonomous moving body boards or disembarks from the car is provided. Consequently, it is possible to call attention to contact between the user and the autonomous moving body in the elevator shared by the user and the autonomous moving body.

BRIEF DESCRIPTION OF DRAWINGS

FIG. 2 is a block diagram of the elevator control device and the autonomous moving body control device in Embodiment 1 of the invention.

FIG. 3 is a perspective view of a hall of an elevator to which the elevator control device in Embodiment 1 of the invention is applied.

FIG. 4 is a perspective view of the inside of a car of the elevator to which the elevator control device in Embodiment 1 of the invention is applied.

FIG. 13 is a hardware configuration diagram of each of the elevator control device and the autonomous moving body control device in Embodiment 1 of the invention.

DESCRIPTION OF EMBODIMENT

Figure 1:
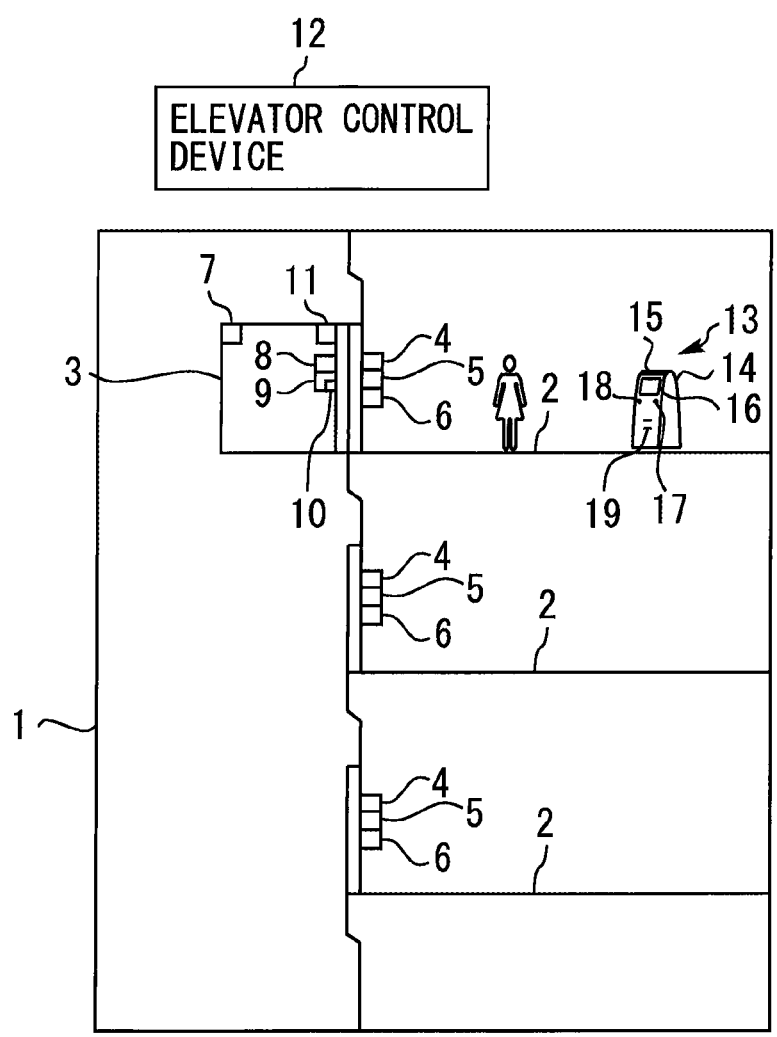
FIG. 1 is a configuration diagram of an elevator system to which an elevator control device in Embodiment 1 of the invention is applied, and an autonomous moving body system to which an autonomous moving body control device in Embodiment 1 of the invention is applied.

An embodiment of the invention will be described according to the accompanying drawings. Note that, in the drawings, the same or corresponding parts are designated by the same reference numerals. The repeated description of the same or corresponding parts will be appropriately simplified or omitted.

Embodiment 1

FIG. 1 is a configuration diagram of an elevator system to which an elevator control device in Embodiment 1 of the present invention is applied, and an autonomous moving body system to which an autonomous moving body control device in Embodiment 1 of the invention is applied.

In the elevator system in FIG. 1, a hoistway 1 passes through the individual floors of a building. For example, a plurality of halls 2 are provided on the floors of the building individually. Each of the plurality of halls 2 faces the hoistway 1. At least one car 3 is provided inside the hoistway 1.

Each of a plurality of hall displays 4 is provided in each of the plurality of halls 2. Each of a plurality of hall lamps 5 is provided in each of the plurality of halls 2. Each of a plurality of hall speakers 6 is provided in each of the plurality of halls 2.

A car camera 7 is provided inside a car 3. A car display 8 is provided inside the car 3. A car lamp 9 is provided inside the car 3. A car speaker 10 is provided inside the car 3. A car projector 11 is provided inside the car 3.

An elevator control device 12 is provided, for example, inside a machine room that is not shown. The elevator control device 12 is provided, for example, inside the hoistway 1.

In the autonomous moving body system in FIG. 1, an autonomous moving body 13 is a mechanical device that can autonomously move without operation by a person. The autonomous moving body 13 is, for example, a robot. The autonomous moving body 13 is, for example, a personal mobility vehicle.

The autonomous moving body 13 includes an autonomous moving body case 14, an autonomous moving body light 15, an autonomous moving body display 16, an autonomous moving body speaker 17, and an autonomous moving body projector 18.

The autonomous moving body case 14 serves as the outer shell of the autonomous moving body 13. The autonomous moving body light 15 is provided, for example, on the upper portion of the front of the autonomous moving body case 14. The autonomous moving body display 16 is provided, for example, immediately below the autonomous moving body light 15 on the front of the autonomous moving body case 14. The autonomous moving body speaker 17 is provided, for example, immediately below the autonomous moving body display 16 on one side on the front of the autonomous moving body case 14. The autonomous moving body projector 18 is provided, for example, immediately below the autonomous moving body display 16 on one side on the front of the autonomous moving body case 14.

An autonomous moving body control device 19 is provided, for example, in the autonomous moving body 13. The autonomous moving body control device 19 is provided, for example, at a place away from the autonomous moving body 13.

The elevator control device 12 controls the operation of the elevator.

The elevator control device 12 controls the operation of the car 3 based on, for example, a call for the elevator. The elevator control device 12 controls the operation of the car 3 based on a hall call from a user or the autonomous moving body 13. The hall call at this point is information corresponding to part or all of a departure floor of the car 3, a desired moving direction of the user in a vertical direction, a destination floor of the car 3, an individual identifier of the autonomous moving body 13, and a machine identifier indicating that the autonomous moving body 13 is a machine. The elevator control device 12 controls the operation of the car 3 based on, for example, a car call from the user or the autonomous moving body 13. The car call at this point is information corresponding to the destination floor. In the case where a plurality of the cars 3 are present, the elevator control device 12 determines an assigned car responding to the call for the elevator.

The elevator control device 12 analyzes, for example, an image taken by the car camera 7. The elevator control device 12 controls, for example, the display of each of the plurality of hall displays 4. The elevator control device 12 controls, for example, the display of each of the plurality of hall lamps 5. The elevator control device 12 controls, for example, the display of the car display 8. The elevator control device 12 controls, for example, the voice output of the car speaker 10. The elevator control device 12 controls, for example, the projection of the car projector 11.

The autonomous moving body control device 19 controls the operation of the autonomous moving body 13.

The autonomous moving body control device 19 controls, for example, the lighting of the autonomous moving body light 15. The autonomous moving body control device 19 controls, for example, the display of the autonomous moving body display 16. The autonomous moving body control device 19 controls, for example, the voice output of the autonomous moving body speaker 17. The autonomous moving body control device 19 controls, for example, the projection of the autonomous moving body projector 18.

In the elevator system and the autonomous moving body system, information is appropriately transmitted and received between the devices. The information is transmitted and received between the devices, for example, at any timing. The information is transmitted and received between the devices, for example, periodically. The information is transmitted and received, for example, in response to requests from the individual devices.

Next, the elevator control device 12 and the autonomous moving body control device 19 will be described by using FIG. 2.

FIG. 2 is a block diagram of the elevator control device and the autonomous moving body control device in Embodiment 1 of the invention.

As shown in FIG. 2, the elevator control device 12 and the autonomous moving body control device 19 exchange information.

The elevator control device 12 receives, for example, the hall call from the autonomous moving body 13 from the autonomous moving body control device 19.

The autonomous moving body control device 19 receives, for example, information on the assigned car from the elevator control device 12 in the case where a plurality of the cars 3 are present. The autonomous moving body control device 19 receives, for example, information on the nearest floor at which the car 3 can stop from the elevator control device 12. The autonomous moving body control device 19 receives, for example, information on the ordinal number of a round trip in which the car 3 responds to the hall call from the elevator control device 12. The autonomous moving body control device 19 receives, for example, information on the travel direction of the car 3 from the elevator control device 12. The autonomous moving body control device 19 receives, for example, information on the start of deceleration when the car 3 responds to the hall call from the elevator control device 12. The autonomous moving body control device 19 receives, for example, information on the start of deceleration when the car 3 responds to the car call from the elevator control device 12.

The elevator control device 12 includes an elevator notification control unit 20. The elevator notification control unit 20 causes equipment provided in the hall 2 of a floor on which the autonomous moving body 13 is present, or equipment provided in the car 3 to provide notification of information indicating that the autonomous moving body 13 boards or disembarks from the car 3 based on the call for the elevator from the autonomous moving body 13.

The elevator notification control unit 20 includes, for example, a boarding notification control unit 20a, a disembarkation notification control unit 20b, a location detection unit 20c, a boarding position notification control unit 20d, and a location movement encouragement unit 20e.

For example, when the elevator control device 12 receives the hall call from the autonomous moving body 13, the boarding notification control unit 20a causes at least one of the hall display 4, the hall lamp 5, and the hall speaker 6 that are provided in the hall 2 of the floor on which the autonomous moving body 13 is present to provide notification that the autonomous moving body 13 will board the car 3. At this point, the hall display 4 displays a message that the autonomous moving body 13 will board the car 3 based on the control by the boarding notification control unit 20a. The hall lamp 5 illuminates a plate on which letters indicating that the autonomous moving body 13 will board the car 3 are described from its backside to display the letters based on the control by the boarding notification control unit 20a. The hall speaker 6 outputs a message that the autonomous moving body 13 will board the car 3 by voice based on the control by the boarding notification control unit 20a.

For example, when the elevator control device 12 receives the car call from the autonomous moving body 13, the disembarkation notification control unit 20b causes at least one of the hall display 4, the hall lamp 5, and the hall speaker 6 that are provided in the hall 2 of the destination floor corresponding to the car call to provide notification that the autonomous moving body 13 will disembark from the car 3. At this point, the hall display 4 displays a message that the autonomous moving body 13 will disembark from the car 3 based on the control by the disembarkation notification control unit 20b. The hall lamp 5 illuminates a plate on which letters indicating that the autonomous moving body 13 will disembark from the car 3 are described from its backside to display the letters based on the control by the disembarkation notification control unit 20b. The hall speaker 6 outputs a message that the autonomous moving body 13 will disembark from the car 3 by voice based on the control by the disembarkation notification control unit 20b.

For example, when the elevator control device 12 receives the hall call from the autonomous moving body 13, and the nearest floor at which the car 3 can stop matches the floor on which the autonomous moving body 13 is present, the boarding notification control unit 20a causes at least one of the car display 8, the car lamp 9, and the car speaker 10 to provide notification that the autonomous moving body 13 will board the car 3. At this point, the car display 8 displays a message that the autonomous moving body 13 will board the car 3 based on the control by the boarding notification control unit 20a. The car lamp 9 illuminates a plate on which letters indicating that the autonomous moving body 13 will board the car 3 are described from its backside to display the letters based on the control by the boarding notification control unit 20a. The car speaker 10 outputs a message that the autonomous moving body 13 will board the car 3 by voice based on the control by the boarding notification control unit 20a.

For example, when the elevator control device 12 receives the car call from the autonomous moving body 13, and the nearest floor at which the car 3 can stop matches the floor on which the autonomous moving body 13 is present, the disembarkation notification control unit 20b causes at least one of the car display 8, the car lamp 9, and the car speaker 10 to provide notification that the autonomous moving body 13 will disembark from the car 3. At this point, the car display 8 displays a message that the autonomous moving body 13 will disembark based on the control by the disembarkation notification control unit 20b. The car lamp 9 illuminates a plate on which letters indicating that the autonomous moving body 13 will disembark from the car 3 are described from its backside to display the letters based on the control by the disembarkation notification control unit 20b. The car speaker 10 outputs a message that the autonomous moving body 13 will disembark from the car 3 by voice based on the control by the disembarkation notification control unit 20b.

The location detection unit 20c detects, for example, the location of the user or the autonomous moving body 13 inside the car 3. The location detection unit 20c detects the location of the user or the autonomous moving body 13 inside the car 3 by, for example, analyzing the image of the car camera 7. For example, the boarding position notification control unit 20d causes at least one of the car display 8 and the car projector 11 to display a position other than the location of the user or the autonomous moving body 13 detected by the location detection unit 20c as the boarding position of the autonomous moving body 13 that will board the car 3. For example, when the location of the user detected by the location detection unit 20c overlaps the boarding position obtained as a result of the notification by the boarding position notification control unit 20d, the location movement encouragement unit 20e causes at least one of the car display 8, the car lamp 9, and the car speaker 10 to notify encouragement of the movement of the location to the user.

The location detection unit 20c detects, for example, the location of the user or the autonomous moving body 13 inside the car 3. The location detection unit 20c detects the location of the user or the autonomous moving body 13 inside the car 3 by, for example, analyzing the image of the car camera 7. For example, the boarding position notification control unit 20d causes at least one of the car display 8 and the car projector 11 to display a position other than the location of the user or the autonomous moving body 13 detected by the location detection unit 20c as the boarding position of the user who will board the car 3. At this point, the car display 8 displays the boarding position of the user in a plan view of the inside of the car 3. The car projector 11 projects the boarding position of the user on a floor surface of the inside of the car 3.

The autonomous moving body control device 19 includes an autonomous moving body notification control unit 21. The autonomous moving body notification control unit 21 causes equipment provided in the autonomous moving body 13 to provide notification of information indicating that the user or the autonomous moving body 13 boards or disembarks from the car 3 based on the call for the elevator from the user or the autonomous moving body 13.

The autonomous moving body notification control unit 21 includes, for example, a boarding notification control unit 21a, a disembarkation notification control unit 21b, a passage number measurement unit 21c, and a boarding position notification control unit 21d.

For example, the boarding notification control unit 21a causes at least one of the autonomous moving body light 15, the autonomous moving body display 16, the autonomous moving body speaker 17, and the autonomous moving body projector 18 of the autonomous moving body 13 to provide notification that the autonomous moving body 13 will board the car 3. At this point, the autonomous moving body light 15 executes preset lighting based on the control by the boarding notification control unit 21a. The autonomous moving body display 16 displays a message that the autonomous moving body 13 will board the car 3 based on the control by the boarding notification control unit 21a. The autonomous moving body speaker 17 outputs a message that the autonomous moving body 13 will board the car 3 by voice based on the control by the boarding notification control unit 21a. The autonomous moving body projector 18 projects a message that the autonomous moving body 13 will board the car 3 based on the control by the boarding notification control unit 21a.

The timing at which the notification is started is appropriately set. The boarding notification control unit 21a starts the notification, for example, when the responding car 3 is determined. The boarding notification control unit 21a starts the notification, for example, when the nearest floor at which the car 3 can stop by using usual deceleration matches the floor on which the autonomous moving body 13 is present. For example, the passage number measurement unit 21c measures the number of times of passage of the car 3 that passes forward in the direction of the hall call from the autonomous moving body 13 based on the current position and the moving direction of the car 3. The boarding notification control unit 21a starts the notification when the ordinal number of the passage obtained as a result of the measurement by the passage number measurement unit 21c corresponds to the ordinal number of a round trip that responds to the hall call from the autonomous moving body 13. Specifically, in the case where the round trip that responds to the hall call from the autonomous moving body 13 is the second round trip, the notification is started when the passage of which the number of times is measured by the passage number measurement unit 21c is the second passage. The boarding notification control unit 21a starts the notification, for example, in the case where the autonomous moving body control device 19 receives information indicating that boarding is allowed from the elevator control device 12. Note that, in the case where the assignment of the hall call is cancelled, the notification is stopped immediately.

For example, when the hall call from the autonomous moving body 13 is present, and a door of the elevator is open on the floor on which the autonomous moving body 13 is present, the boarding position notification control unit 21d causes the autonomous moving body projector 18 to project at least one of the boarding position of the autonomous moving body 13 inside the car 3 and a travel path to the boarding position. The boarding position notification control unit 21d moves a projection position in accordance with the movement of the autonomous moving body 13.

For example, when the car call from the autonomous moving body 13 is present, and the nearest floor at which the car 3 can stop by using usual deceleration matches the destination floor of the autonomous moving body 13, the disembarkation notification control unit 21b causes at least one of the autonomous moving body light 15, the autonomous moving body display 16, the autonomous moving body speaker 17, and the autonomous moving body projector 18 to provide notification that the autonomous moving body 13 will disembark from the car 3. At this point, the autonomous moving body light 15 executes preset lighting based on the control by the disembarkation notification control unit 21b. The autonomous moving body display 16 displays a message that the autonomous moving body 13 will disembark based on the control by the disembarkation notification control unit 21b. The autonomous moving body speaker 17 outputs a message that the autonomous moving body 13 will disembark from the car 3 by voice based on the control by the disembarkation notification control unit 21b. The autonomous moving body projector 18 projects a message that the autonomous moving body 13 will disembark based on the control by the disembarkation notification control unit 21b.

For example, when the car call from the user corresponding to the floor on which the autonomous moving body 13 is present is present, and the nearest floor at which the car 3 can stop matches the floor on which the autonomous moving body 13 is present, the disembarkation notification control unit 21b causes at least one of the autonomous moving body light 15, the autonomous moving body display 16, the autonomous moving body speaker 17, and the autonomous moving body projector 18 to provide notification that the user will disembark from the car 3. At this point, the autonomous moving body light 15 executes preset lighting based on the control by the disembarkation notification control unit 21b. The autonomous moving body display 16 displays a message that the user will disembark based on the control by the disembarkation notification control unit 21b. The autonomous moving body speaker 17 outputs a message that the user will disembark from the car 3 by voice based on the control by the disembarkation notification control unit 21b. The autonomous moving body projector 18 projects a message that the user will disembark based on the control by the disembarkation notification control unit 21b. Note that the autonomous moving body 13 may not board the car 3.

For example, the boarding notification control unit 21a causes at least one of the autonomous moving body light 15, the autonomous moving body display 16, the autonomous moving body speaker 17, and the autonomous moving body projector 18 to provide notification that the user will board the car 3. At this point, the autonomous moving body light 15 executes preset lighting based on the control by the boarding notification control unit 21a. The autonomous moving body display 16 displays a message that the user will board based on the control by the boarding notification control unit 21a. The autonomous moving body speaker 17 outputs a message that the user will board the car 3 by voice based on the control by the boarding notification control unit 21a. The autonomous moving body projector 18 projects a message that the user will board the car 3 based on the control by the boarding notification control unit 21a. Note that the autonomous moving body 13 may not board the car 3.

The timing at which the notification is started is appropriately set. The boarding notification control unit 21a starts the notification, for example, when the responding car 3 is determined. The boarding notification control unit 21a starts the notification, for example, when the nearest floor at which the car 3 can stop by using usual deceleration matches the floor on which the autonomous moving body 13 is present. The boarding notification control unit 21a starts the notification, for example, when the car 3 starts to decelerate toward the floor on which the autonomous moving body 13 is present in response to the hall call from the user. For example, the passage number measurement unit 21c measures the number of times of passage of the car 3 that passes forward in the direction of the hall call from the autonomous moving body 13 based on the current position and the moving direction of the car 3. The boarding notification control unit 21a starts the notification when the ordinal number of the passage obtained as a result of the measurement by the passage number measurement unit 21c corresponds to the ordinal number of the round trip that responds to the hall call from the user. Specifically, in the case where the round trip that responds to the hall call from the autonomous moving body 13 is the second round trip, the notification is started when the passage of which the number of times is measured by the passage number measurement unit 21c is the second passage. The boarding notification control unit 21a starts the notification, for example, in the case where the autonomous moving body control device 19 receives the information indicating that boarding is allowed from the elevator control device 12. Note that, in the case where the assignment of the hall call is cancelled, the notification is stopped immediately.

For example, the boarding position notification control unit 21d causes the autonomous moving body projector 18 of the autonomous moving body 13 in the hall 2 to project the boarding position of the user inside the car 3.

For example, the boarding notification control unit 21a causes at least one of the autonomous moving body light 15, the autonomous moving body display 16, the autonomous moving body speaker 17, and the autonomous moving body projector 18 of the autonomous moving body 13 inside the car 3 to provide notification that the user will board the car 3. For example, when the nearest floor at which the car 3 can stop by using usual deceleration matches the floor on which the user boards the car 3, the boarding notification control unit 21a causes at least one of the autonomous moving body light 15, the autonomous moving body display 16, the autonomous moving body speaker 17, and the autonomous moving body projector 18 to provide notification that the user will board the car 3. At this point, the autonomous moving body light 15 executes preset lighting based on the control by the boarding notification control unit 21a. The autonomous moving body display 16 displays a message that the user will board the car 3 based on the control by the boarding notification control unit 21a. The autonomous moving body speaker 17 outputs a message that the user will board the car 3 by voice based on the control by the boarding notification control unit 21a. The autonomous moving body projector 18 projects a message that the user will board the car 3 based on the control by the boarding notification control unit 21a.

For example, the disembarkation notification control unit 21b causes at least one of the autonomous moving body light 15, the autonomous moving body display 16, the autonomous moving body speaker 17, and the autonomous moving body projector 18 of the autonomous moving body 13 inside the car 3 to provide notification that the user will disembark from the car 3. For example, when the nearest floor at which the car 3 can stop by using usual deceleration matches the destination floor corresponding to the car call from the user, the disembarkation notification control unit 21b causes at least one of the autonomous moving body light 15, the autonomous moving body display 16, the autonomous moving body speaker 17, and the autonomous moving body projector 18 to provide notification that the user will disembark from the car 3. For example, when the car 3 starts to decelerate toward the destination floor corresponding to the car call from the user, the disembarkation notification control unit 21b causes at least one of the autonomous moving body light 15, the autonomous moving body display 16, the autonomous moving body speaker 17, and the autonomous moving body projector 18 to provide notification that the user will disembark from the car 3. At this point, the autonomous moving body light 15 executes preset lighting based on the control by the disembarkation notification control unit 21b. The autonomous moving body display 16 displays a message that the user will disembark from the car 3 based on the control by the disembarkation notification control unit 21b. The autonomous moving body speaker 17 outputs a message that the user will disembark from the car 3 by voice based on the control by the disembarkation notification control unit 21b. The autonomous moving body projector 18 projects a message that the user will disembark from the car 3 based on the control by the disembarkation notification control unit 21b.

For example, the boarding position notification control unit 21d causes the autonomous moving body projector 18 of the autonomous moving body 13 inside the car 3 to project the boarding position of the user inside the car 3.

Next, the notification of the boarding of the autonomous moving body 13 in the hall 2 by the elevator control device 12 will be described by using FIG. 3.

FIG. 3 is a perspective view of the hall of the elevator to which the elevator control device in Embodiment 1 of the invention is applied.

In the case where the autonomous moving body 13 that is not shown in FIG. 3 is scheduled to board the car 3, the hall display 4 displays information indicating that "Robot will board". The hall lamp 5 displays information of "robot boarding" by illuminating the plate from its backside. The hall speaker 6 outputs information indicating that "Robot will board" by voice.

Next, the notification of the boarding of the autonomous moving body 13 inside the car 3 by the elevator control device 12 will be described by using FIG. 4.

FIG. 4 is a perspective view of the inside of the car of the elevator to which the elevator control device in Embodiment 1 of the invention is applied.

In the case where the autonomous moving body 13 that is not shown in FIG. 4 is scheduled to board the car 3, the car display 8 displays information indicating that "Robot will board". The car lamp 9 displays information of "robot boarding" by illuminating the plate from its backside. The car speaker 10 outputs information indicating that "Robot will board" by voice.

Next, the notification of the boarding position of the autonomous moving body 13 inside the car 3 by the elevator control device 12 will be described by using FIG. 5.

Figure 5:
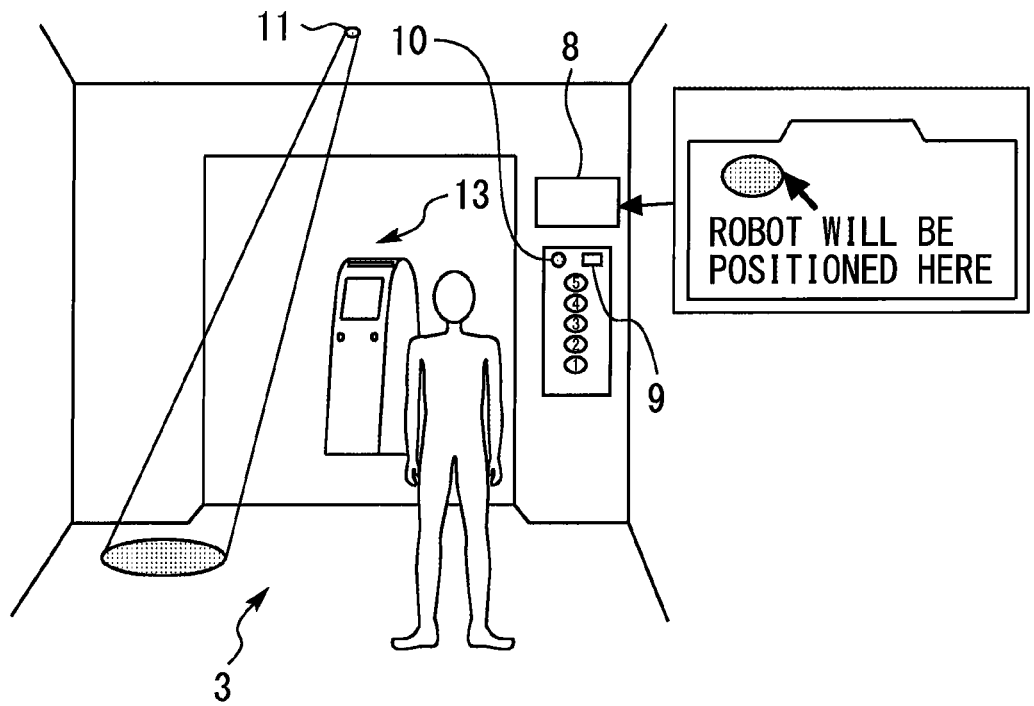
FIG. 5 is a perspective view of the inside of the car of the elevator to which the elevator control device in Embodiment 1 of the invention is applied.

FIG. 5 is a perspective view of the inside of the car of the elevator to which the elevator control device in Embodiment 1 of the invention is applied.

As shown in FIG. 5, in the case where the autonomous moving body 13 is scheduled to board the car 3, the car display 8 displays an oval piece of information as the boarding position of the autonomous moving body 13 in the plan view of the inside of the car 3. The car projector 11 projects an oval piece of information on the floor surface of the inside of the car 3 as the boarding position of the autonomous moving body 13.

Next, the notification of the boarding of the autonomous moving body 13 in the hall 2 by the autonomous moving body control device 19 will be described by using FIG. 6.

Figure 6:
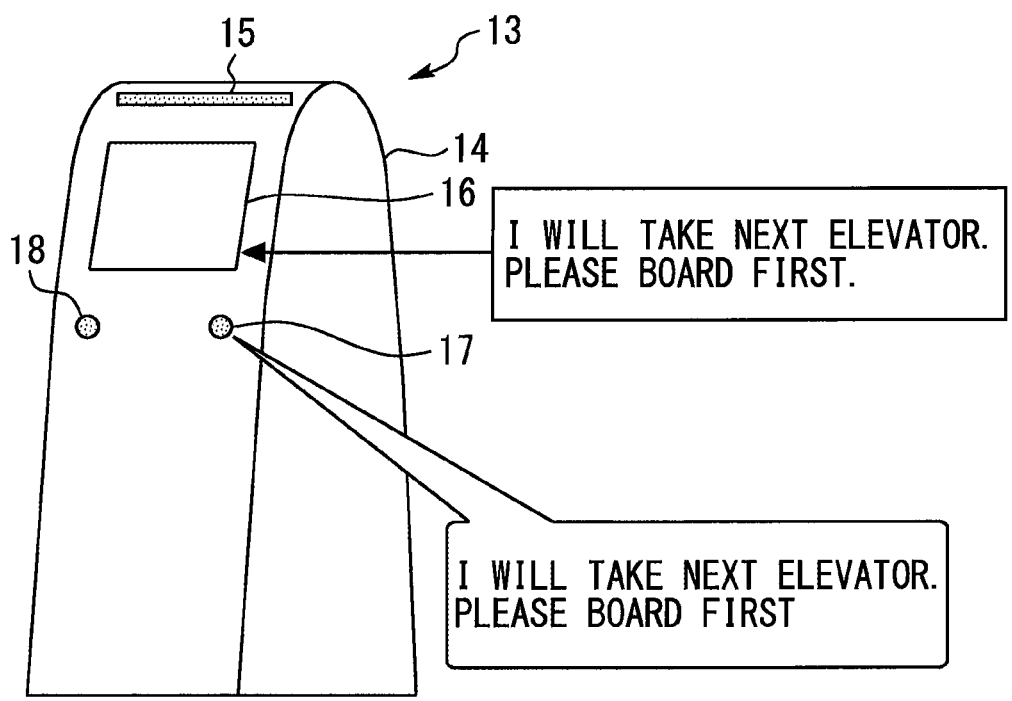
FIG. 6 is a perspective view of an autonomous moving body to which the autonomous moving body control device in Embodiment 1 of the invention is applied.

FIG. 6 is a perspective view of the autonomous moving body to which the autonomous moving body control device in Embodiment 1 of the invention is applied.

As shown in FIG. 6, in the case where the autonomous moving body 13 is scheduled to board the car 3, the autonomous moving body light 15 maintains its lighted state. The autonomous moving body display 16 displays information indicating that "I will take next elevator. Please board first". The autonomous moving body speaker 17 outputs information indicating that "I will take next elevator. Please board first" by voice.

Next, the notification of the boarding position of the autonomous moving body 13 and the travel path to the boarding position by the autonomous moving body control device 19 will be described by using FIG. 7.

Figure 7:
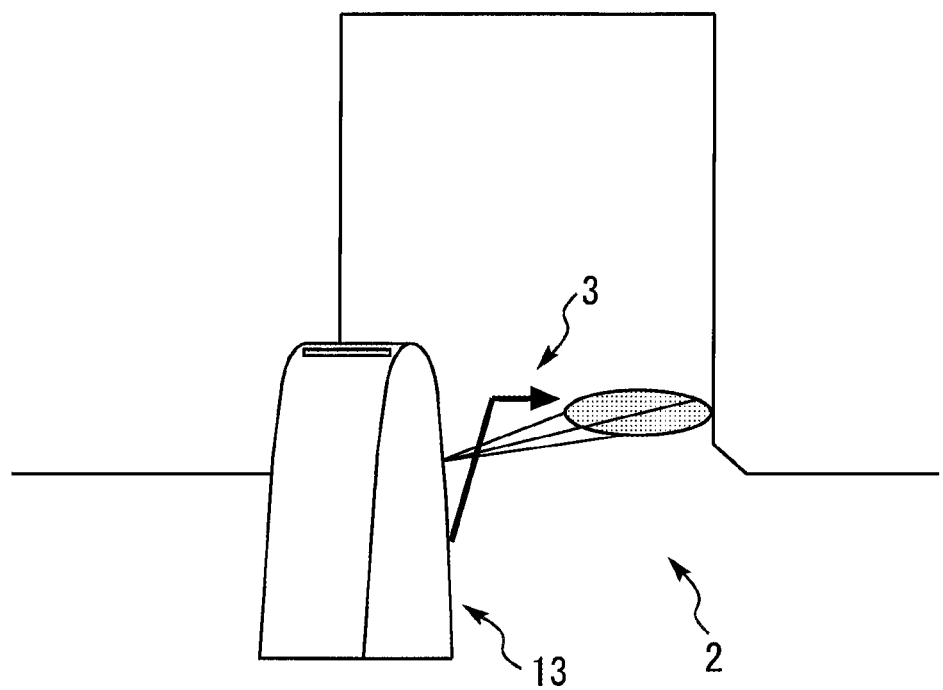
FIG. 7 is a perspective view of a hall of a floor on which the autonomous moving body to which the autonomous moving body control device in Embodiment 1 of the invention is applied is present.

FIG. 7 is a perspective view of the hall of the floor on which the autonomous moving body to which the autonomous moving body control device in Embodiment 1 of the invention is applied is present.

As shown in FIG. 7, in the case where the autonomous moving body 13 is scheduled to board the car 3, the autonomous moving body 13 projects an oval piece of information on the floor surface of the inside of the car 3 as the boarding position of the autonomous moving body 13. The autonomous moving body 13 projects an arrow-shaped piece of information on the floor surface of the hall 2 and the floor surface of the inside of the car 3 continuously as the travel path to the boarding position of the autonomous moving body 13.

Next, the detail of the projection by the autonomous moving body 13 will be described by using FIGS. 8 to 10.

Figure 8:
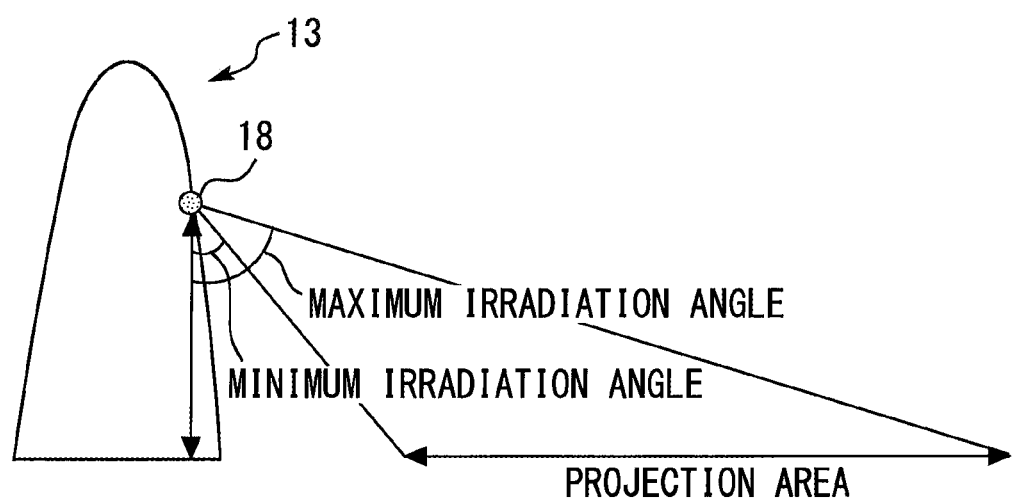
FIG. 8 is a view for explaining the detail of projection by the autonomous moving body to which the autonomous moving body control device in Embodiment 1 of the invention is applied.
Figure 9:
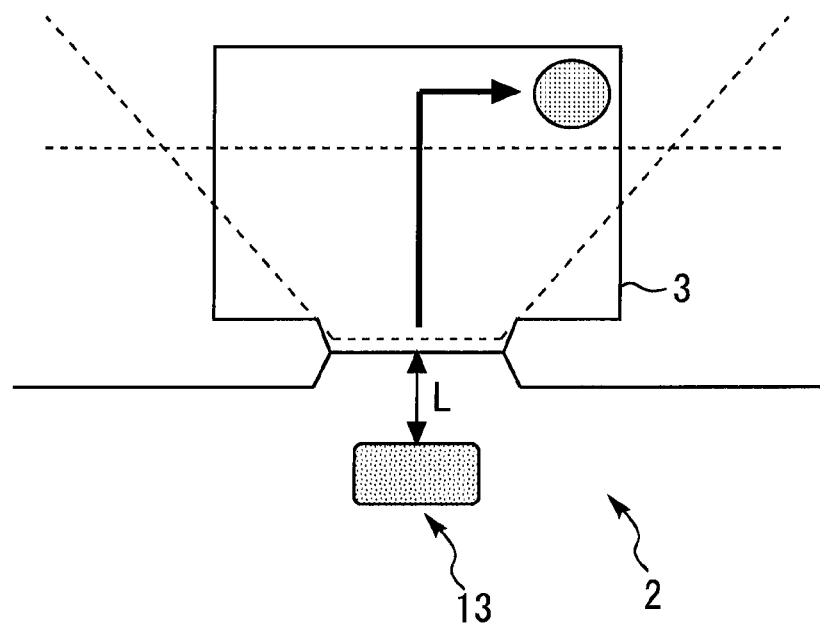
FIG. 9 is a view for explaining the detail of the projection by the autonomous moving body to which the autonomous moving body control device in Embodiment 1 of the invention is applied.
Figure 10:
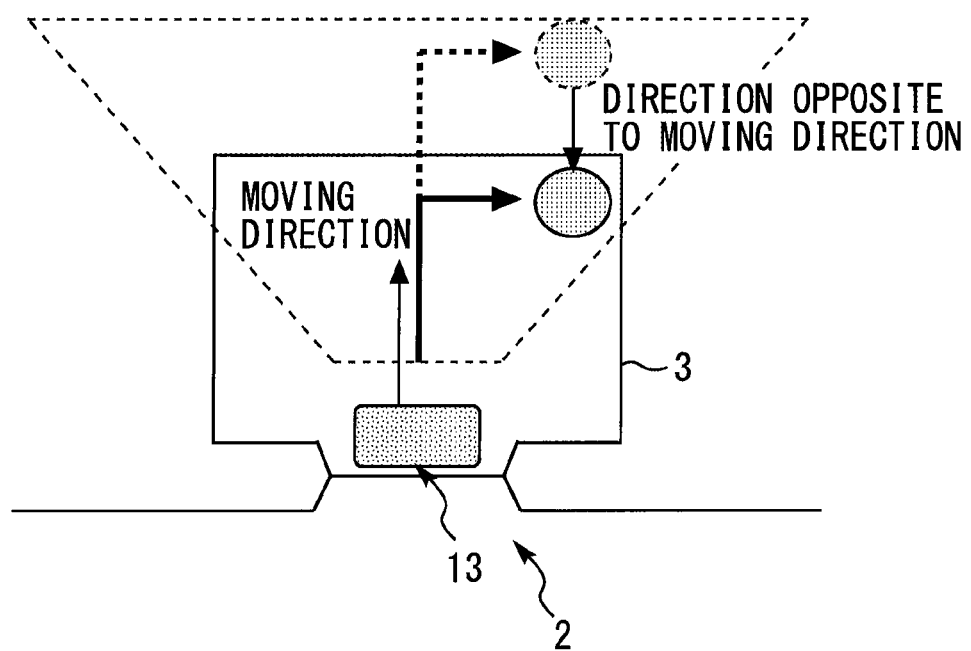
FIG. 10 is a view for explaining the detail of the projection by the autonomous moving body to which the autonomous moving body control device in Embodiment 1 of the invention is applied.

Each of FIGS. 8 to 10 is a view for explaining the detail of the projection by the autonomous moving body to which the autonomous moving body control device in Embodiment 1 of the invention is applied.

As shown in FIG. 8, the projection area of the autonomous moving body projector 18 is determined based on the height of the autonomous moving body projector 18 from the floor surface, the minimum projection angle, and the maximum projection angle. The autonomous moving body projector 18 determines the position where a specific piece of information is projected in the projection area based on the current position of the autonomous moving body 13 and the internal dimensions of the car 3.

The autonomous moving body 13 receives information on the internal dimensions of the car 3 from the elevator control device 12 in advance. As shown in FIG. 9, in the case where the autonomous moving body 13 is present at a position spaced from the center of the door by a preset distance L, the autonomous moving body 13 determines the projection position of each of the boarding position and the travel path to the boarding position in the projection area.

As shown in FIG. 10, when the state of the projection is maintained in the case where the autonomous moving body 13 has started to move, the projection position of each of the boarding position and the travel path to the boarding position is shifted from the original position. To cope with this, in the case where the autonomous moving body 13 has started to move, the projection position of each of the boarding position and the travel path to the boarding position moves in a direction opposite to the moving direction of the autonomous moving body 13 at the same speed as the travel speed of the autonomous moving body 13 by the same distance as the movement distance of the autonomous moving body 13. As a result, the projection position of each of the boarding position and the travel path to the boarding position is not shifted from the original position.

Next, the outline of operations of the elevator control device 12 will be described by using FIG. 11.

Figure 11:
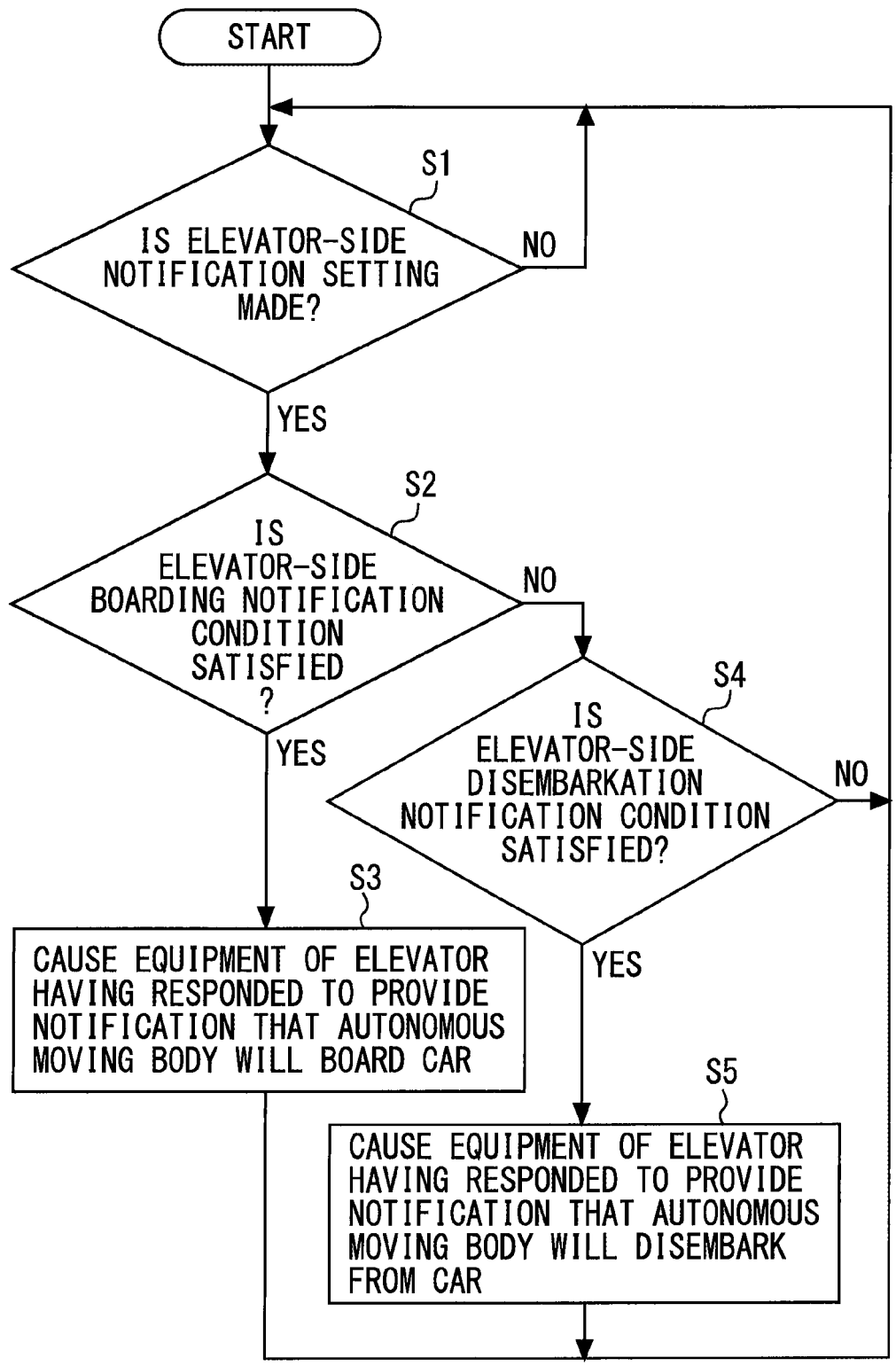
FIG. 11 is a view for explaining the outline of operations of the elevator control device in Embodiment 1 of the invention.

FIG. 11 is a view for explaining the outline of operations of the elevator control device in Embodiment 1 of the invention.

In Step S1, the elevator control device 12 determines whether or not an elevator-side notification setting for providing notification of information indicating that the autonomous moving body 13 boards or disembarks from the car 3 is made. In the case where the elevator-side notification setting is not made in Step S1, the elevator control device 12 performs the operation in Step S1. In the case where the elevator-side notification setting is made in Step S1, the elevator control device 12 performs the operation in Step S2.

In Step S2, the elevator control device 12 determines whether or not an elevator-side boarding notification condition for providing notification that the autonomous moving body 13 will board the car 3 is satisfied.

In the case where the elevator-side boarding notification condition is satisfied is Step S2, the elevator control device 12 performs the operation in Step S3. In Step S3, the elevator control device 12 causes the equipment of the elevator having responded based on the elevator-side boarding notification condition to provide notification that the autonomous moving body 13 will board the car 3. Thereafter, the elevator control device 12 performs the operation in Step S1.

In the case where the elevator-side boarding notification condition is not satisfied in Step S2, the elevator control device 12 performs the operation in Step S4. In Step S4, the elevator control device 12 determines whether or not an elevator-side disembarkation notification condition for providing notification that the autonomous moving body 13 will disembark from the car 3 is satisfied.

In the case where the elevator-side disembarkation notification condition is satisfied in Step S4, the elevator control device 12 performs the operation in Step S5. In Step S5, the elevator control device 12 causes the equipment of the elevator having responded based on the elevator-side disembarkation notification condition to provide notification that the autonomous moving body 13 will disembark from the car 3. Thereafter, the elevator control device 12 performs the operation in Step S1.

In the case where the elevator-side disembarkation notification condition is not satisfied in Step S4, the elevator control device 12 performs the operation in Step S1.

Next, the outline of operations of the autonomous moving body control device 19 will be described by using FIG. 12.

Figure 12:
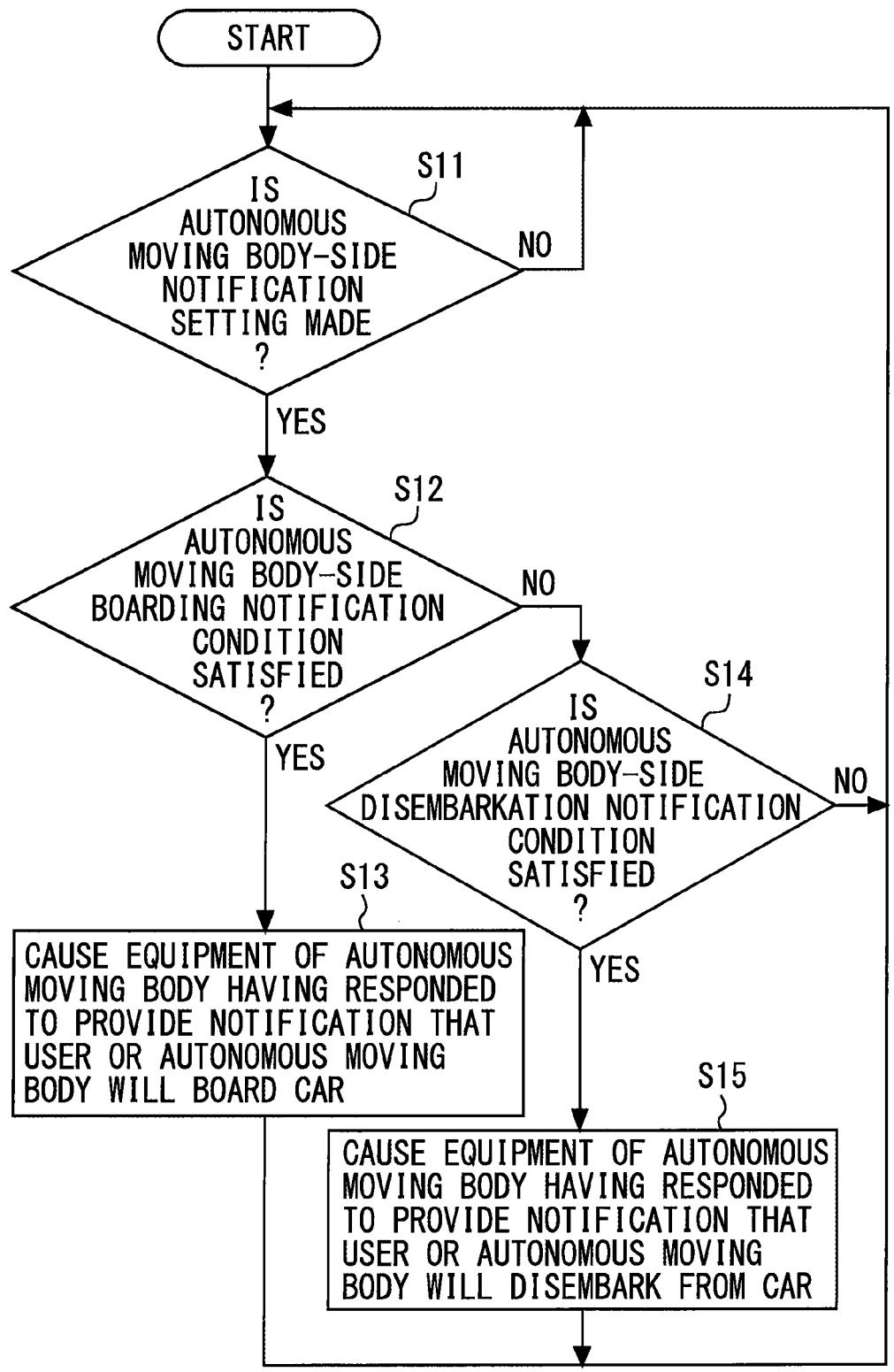
FIG. 12 is a view for explaining the outline of operations of the autonomous moving body control device in Embodiment 1 of the invention.

FIG. 12 is a view for explaining the outline of operations of the autonomous moving body control device in Embodiment 1 of the invention.

In Step S11, the autonomous moving body control device 19 determines whether or not an autonomous moving body-side notification setting for providing notification of information indicating that the user or the autonomous moving body 13 boards or disembarks from the car 3 is made. In the case where the autonomous moving body-side notification setting is not made in Step S11, the autonomous moving body control device 19 performs the operation in Step S11. In the case where the autonomous moving body-side notification setting is made in Step S11, the autonomous moving body control device 19 performs the operation in Step S12.

In Step S12, the autonomous moving body control device 19 determines whether or not an autonomous moving body-side boarding notification condition for providing notification that the user or the autonomous moving body 13 will board the car 3 is satisfied.

In the case where the autonomous moving body-side boarding notification condition is satisfied in Step S12, the autonomous moving body control device 19 performs the operation in Step S13. In Step S13, the autonomous moving body control device 19 causes the equipment of the autonomous moving body 13 having responded based on the autonomous moving body-side boarding notification condition to provide notification that the user or the autonomous moving body 13 will board the car 3. Thereafter, the autonomous moving body control device 19 performs the operation in Step S11.

In the case where the autonomous moving body-side boarding notification condition is not satisfied in Step S12, the autonomous moving body control device 19 performs the operation in Step S14. In Step S14, the autonomous moving body control device 19 determines whether or not an autonomous moving body-side disembarkation notification condition for providing notification that the autonomous moving body 13 will disembark from the car 3 is satisfied.

In the case where the autonomous moving body-side disembarkation notification condition is satisfied in Step S14, the autonomous moving body control device 19 performs the operation in Step S15. In Step S15, the autonomous moving body control device 19 causes the equipment of the autonomous moving body 13 having responded based on the autonomous moving body-side disembarkation notification condition to provide notification that the user or the autonomous moving body 13 will disembark from the car 3. Thereafter, the autonomous moving body control device 19 performs the operation in Step S11.

In the case where the autonomous moving body-side disembarkation notification condition is not satisfied in Step S14, the autonomous moving body control device 19 performs the operation in Step S11.

According to Embodiment 1 described above, the elevator control device 12 causes the equipment provided in the hall 2 of the floor on which the autonomous moving body 13 is present or the equipment provided in the car 3 to provide notification of the information indicating that the autonomous moving body 13 boards or disembarks from the car 3 based on the call for the elevator from the autonomous moving body 13. Consequently, it is possible to call attention to contact between the user and the autonomous moving body 13 in the elevator shared by the user and the autonomous moving body 13. As a result, it is possible to improve the safety and comfort of the user.

For example, the elevator control device 12 causes at least one of the hall display 4, the hall lamp 5, and the hall speaker 6 that are provided in the hall 2 of the floor on which the autonomous moving body 13 is present to provide notification that the autonomous moving body 13 will board the car 3. Consequently, it is possible to call attention to contact between the user and the autonomous moving body 13 in the hall 2 of the floor on which the autonomous moving body 13 is present.

For example, the elevator control device 12 causes at least one of the hall display 4, the hall lamp 5, and the hall speaker 6 that are provided in the hall 2 of the destination floor corresponding to the car call from the autonomous moving body 13 to provide notification that the autonomous moving body 13 will disembark from the car 3. Consequently, it is possible to call attention to contact between the user and the autonomous moving body 13 in the hall 2 of the destination floor of the autonomous moving body 13.

For example, when the nearest floor at which the car 3 can stop matches the floor on which the autonomous moving body 13 is present, the elevator control device 12 causes at least one of the car display 8, the car lamp 9, and the car speaker 10 to provide notification that the autonomous moving body 13 will board the car 3. Consequently, it is possible to call attention to contact between the user and the autonomous moving body 13 on the floor on which the autonomous moving body 13 is present.

For example, when the nearest floor at which the car 3 can stop matches the destination floor corresponding to the car call from the autonomous moving body 13, the elevator control device 12 causes at least one of the car display 8, the car lamp 9, and the car speaker 10 to provide notification that the autonomous moving body 13 will disembark from the car 3. Consequently, it is possible to call attention to contact between the user and the autonomous moving body 13 inside the car 3.

For example, the elevator control device 12 causes at least one of the car display 8 and the car projector 11 to provide notification of the position other than the location of the user or the autonomous moving body 13, as the boarding position of the autonomous moving body 13 that will board the car 3. Consequently, it is possible to call attention to contact between the user and the autonomous moving body 13 inside the car 3.

For example, the elevator control device 12 detects the location of the user or the autonomous moving body 13 inside the car 3 by analyzing the image of the car camera 7. Consequently, it is possible to easily detect the location of the user or the autonomous moving body 13 inside the car 3.

For example, when the location of the user overlaps the boarding position of the autonomous moving body 13, the elevator control device 12 causes at least one of the car display 8, the car lamp 9, and the car speaker 10 to notify the encouragement of the movement of the location to the user. Consequently, it is possible to easily avoid contact between the user and the autonomous moving body 13 inside the car 3.

For example, the elevator control device 12 causes at least one of the car display 8 and the car projector 11 to provide notification of the position other than the location of the user or the autonomous moving body 13, as the boarding position of the user who will board the car 3. Consequently, it is possible to call attention to contact between the user and the autonomous moving body 13 inside the car 3.

In addition, the autonomous moving body control device 19 causes the equipment provided in the autonomous moving body 13 to provide notification of the information indicating that the user or the autonomous moving body 13 boards or disembarks from the car 3. Consequently, it is possible to call attention to contact between the user and the autonomous moving body 13 in the elevator shared by the user and the autonomous moving body 13. As a result, it is possible to improve the safety and comfort of the user.

For example, when the nearest floor at which the car 3 can stop matches the floor on which the autonomous moving body 13 is present, the autonomous moving body control device 19 causes at least one of the autonomous moving body light 15, the autonomous moving body display 16, the autonomous moving body speaker 17, and the autonomous moving body projector 18 that are provided in the autonomous moving body 13 to provide notification that the autonomous moving body 13 will board the car 3. Consequently, it is possible to call attention to contact between the user and the autonomous moving body 13 on the floor on which the autonomous moving body 13 is present.

For example, when the ordinal number of the passage of the car 3 corresponds to the ordinal number of the round trip that responds to the hall call from the autonomous moving body 13, the autonomous moving body control device 19 causes at least one of the autonomous moving body light 15, the autonomous moving body display 16, the autonomous moving body speaker 17, and the autonomous moving body projector 18 that are provided in the autonomous moving body 13 to provide notification that the autonomous moving body 13 will board the car 3. Consequently, it is possible to call attention to contact between the user and the autonomous moving body 13 on the floor on which the autonomous moving body 13 is present.

For example, when the autonomous moving body control device 19 receives the information indicating that boarding is allowed from the elevator control device 12, the autonomous moving body control device 19 causes at least one of the autonomous moving body light 15, the autonomous moving body display 16, the autonomous moving body speaker 17, and the autonomous moving body projector 18 that are provided in the autonomous moving body 13 to provide notification that the autonomous moving body 13 will board the car 3. Consequently, it is possible to call attention to contact between the user and the autonomous moving body 13 on the floor on which the autonomous moving body 13 is present.

For example, in the case where the autonomous moving body 13 has started to move, the autonomous moving body control device 19 moves the projection position of the boarding position of the autonomous moving body 13 or the travel path to the boarding position in the direction opposite to the moving direction of the autonomous moving body 13 at the same speed as the travel speed of the autonomous moving body by the same distance as the movement distance of the autonomous moving body. Consequently, it is possible to accurately project the boarding position of the autonomous moving body 13.

For example, when the nearest floor at which the car 3 can stop matches the destination floor corresponding to the car call from the autonomous moving body 13, the autonomous moving body control device 19 causes at least one of the autonomous moving body light 15, the autonomous moving body display 16, the autonomous moving body speaker 17, and the autonomous moving body projector 18 that are provided in the autonomous moving body 13 to provide notification that the autonomous moving body 13 will disembark from the car 3. Consequently, it is possible to call attention to contact between the user and the autonomous moving body 13 inside the car 3.

For example, when the car call from the user corresponding to the floor on which the autonomous moving body 13 is present is present, and the nearest floor at which the car 3 can stop matches the floor on which the autonomous moving body 13 is present, the autonomous moving body control device 19 causes at least one of the autonomous moving body light 15, the autonomous moving body display 16, the autonomous moving body speaker 17, and the autonomous moving body projector 18 that are provided in the autonomous moving body 13 to provide notification that the user will disembark from the car 3. Consequently, it is possible to call attention to contact between the user and the autonomous moving body 13 in the hall 2 of the floor on which the autonomous moving body 13 is present.

For example, when the car 3 starts to decelerate toward the floor on which the autonomous moving body 13 is present in response to the hall call from the user, the autonomous moving body control device 19 causes at least one of the autonomous moving body light 15, the autonomous moving body display 16, the autonomous moving body speaker 17, and the autonomous moving body projector 18 that are provided in the autonomous moving body 13 to provide notification that the user will board the car 3. Consequently, it is possible to call attention to contact between the user and the autonomous moving body 13 in the hall 2 of the floor on which the autonomous moving body 13 is present.

For example, when the car 3 starts to decelerate toward the destination floor corresponding to the car call from the user, the autonomous moving body control device 19 causes at least one of the autonomous moving body light 15, the autonomous moving body display 16, the autonomous moving body speaker 17, and the autonomous moving body projector 18 that are provided in the autonomous moving body 13 present inside the car 3 to provide notification that the user will disembark from the car 3. Consequently, it is possible to call attention to contact between the user and the autonomous moving body 13 inside the car 3.

Note that, in the case where a plurality of the cars 3 are present, a group management device determines the assignment of the call for the elevator. Consequently, the individual functions of the elevator control device 12 in Embodiment 1 may be implemented by the group management device.

In addition, there are cases where at least part of the elevator control device 12 in Embodiment 1 is provided separately from an "elevator control device" that manages the control of the elevator. For example, there are cases where at least part of the elevator control device 12 in Embodiment 1 is electrically connected between the "elevator control device" and an external system or the like. At this point, at least part of the elevator control device 12 in Embodiment 1 is provided so as to be able to swap information with the "elevator control device". At least part of the elevator control device 12 in Embodiment 1 is provided so as to be able to swap information with the external system or the like.

Further, there are cases where at least part of the autonomous moving body control device 19 in Embodiment 1 is provided separately from an "autonomous moving body control device" that manages the control of the autonomous moving body 13. For example, there are cases where at least part of the autonomous moving body control device 19 in Embodiment 1 is electrically connected between the "autonomous moving body control device" and an external system or the like. At this point, at least part of the autonomous moving body control device 19 in Embodiment 1 is provided so as to be able to swap information with the "autonomous moving body control device". At least part of the autonomous moving body control device 19 in Embodiment 1 is provided so as to be able to swap information with the external system or the like.

Next, examples of the elevator control device 12 and the autonomous moving body control device 19 will be described by using FIG. 13.

FIG. 13 is a hardware configuration diagram of each of the elevator control device and the autonomous moving body control device in Embodiment 1 of the invention.

The individual functions of the elevator control device 12 can be implemented by processing circuitry. The processing circuitry includes, for example, at least one processor 22a and at least one memory 22b. The processing circuitry includes, for example, at least one dedicated hardware 23.

In the case where the processing circuitry includes at least one processor 22a and at least one memory 22b, the individual functions of the elevator control device 12 are implemented by software, firmware, or a combination of software and firmware. At least one of the software and the firmware is described as a program. At least one of the software and the firmware is stored in at least one memory 22b. At least one processor 22a implements the individual functions of the elevator control device 12 by reading and executing the program stored in at least one memory 22b. At least one processor 22a is also referred to as a CPU (Central Processing Unit), a central processor, a processing unit, an arithmetic unit, a microprocessor, a microcomputer, or a DSP. At least one memory 22b corresponds to, for example, a non-volatile or volatile semiconductor memory such as a RAM, a ROM, a flash memory, an EPROM, or an EEPROM, a magnetic disk, a flexible disk, an optical disk, a compact disc, a minidisc, or a DVD.

In the case where the processing circuitry includes at least one dedicated hardware 23, the processing circuitry is implemented by, for example, a single circuit, a composite circuit, a programmed processor, a parallel-programmed processor, an ASIC, an FPGA, or a combination thereof. For example, the functions of the elevator control device 12 are individually implemented by the processing circuitry. For example, the functions of the elevator control device 12 are collectively implemented by the processing circuitry.

Part of the functions of the elevator control device 12 may be implemented by the dedicated hardware 23, and the other part thereof may be implemented by software or firmware. For example, the processing circuitry serving as the dedicated hardware 23 may implement the function of the boarding position notification control unit 20d, and at least one processor 22a may implement functions other than the function of the boarding position notification control unit 20d by reading and executing the program stored in at least one memory 22b.

Thus, the processing circuitry implements the individual functions of the elevator control device 12 by using the hardware 23, the software, the firmware, or a combination thereof.

The individual functions of the autonomous moving body control device 19 can be implemented by processing circuitry. The processing circuitry includes, for example, at least one processor 24a and at least one memory 24b. The processing circuitry includes, for example, at least one dedicated hardware 25.

In the case where the processing circuitry includes at least one processor 24a and at least one memory 24b, the individual functions of the autonomous moving body control device 19 are implemented by software, firmware, or a combination of software and firmware. At least one of the software and the firmware is described as a program. At least one of the software and the firmware is stored in at least one memory 24b. At least one processor 24a implements the individual functions of the autonomous moving body control device 19 by reading and executing the program stored in at least one memory 24b. At least one processor 24a is also referred to as a CPU (Central Processing Unit), a central processor, a processing unit, an arithmetic unit, a microprocessor, a microcomputer, or a DSP. At least one memory 24b corresponds to, for example, a non-volatile or volatile semiconductor memory such as a RAM, a ROM, a flash memory, an EPROM, or an EEPROM, a magnetic disk, a flexible disk, an optical disk, a compact disc, a minidisc, or a DVD.

In the case where the processing circuitry includes at least one dedicated hardware 25, the processing circuitry is implemented by, for example, a single circuit, a composite circuit, a programmed processor, a parallel-programmed processor, an ASIC, an FPGA, or a combination thereof. For example, the functions of the autonomous moving body control device 19 are individually implemented by the processing circuitry. For example, the functions of the autonomous moving body control device 19 are collectively implemented by the processing circuitry.

Part of the functions of the autonomous moving body control device 19 may be implemented by the dedicated hardware 25, and the other part thereof may be implemented by software or firmware. For example, the processing circuitry serving as the dedicated hardware 25 may implement the function of the boarding position notification control unit 21d, and at least one processor 24a may implement functions other than the function of the boarding position notification control unit 21d by reading and executing the program stored in at least one memory 24b.

Thus, the processing circuitry implements the individual functions of the autonomous moving body control device 19 by using the hardware 25, the software, the firmware, or a combination thereof.

INDUSTRIAL APPLICABILITY

As described above, the elevator control device and the autonomous moving body control device can be applied to the system that calls attention to contact between the user and the autonomous moving body 13 in the elevator shared by the user and the autonomous moving body 13.

REFERENCE SIGNS LIST

1 Hoistway
2 Hall
3 Car
4 Hall display
5 Hall lamp
6 Hall speaker
7 Car camera
8 Car display
9 Car lamp
10 Car speaker
11 Car projector
12 Elevator control device
13 Autonomous moving body
14 Autonomous moving body case
15 Autonomous moving body light
16 Autonomous moving body display
17 Autonomous moving body speaker
18 Autonomous moving body projector
19 Autonomous moving body control device
20 Elevator notification control unit
20a Boarding notification control unit
20b Disembarkation notification control unit
20c Location detection unit
20d Boarding position notification control unit
20e Location movement encouragement unit
21 Autonomous moving body notification control unit
21a Boarding notification control unit
21b Disembarkation notification control unit
21c Passage number measurement unit
21d Boarding position notification control unit
22a Processor
22b Memory
23 Hardware
24a Processor
24b Memory
25 Hardware

The invention claimed is:
1. An autonomous moving body control device, comprising:
a processor to execute a program; and
a memory to store the program which, when executed by the processor, performs processes of,
measuring, based on a current position and a moving direction of a car, a number of times the car passes a floor from the autonomous moving body was made while traveling in a same direction as that requested by the hall call; and causing, in response to an ordinal number of the number of times the car passes obtained by the measuring corresponding to an ordinal number of round trips that has been stored according to the hall call from the autonomous moving body, at least one of an autonomous moving body light, an autonomous moving body display, an autonomous moving body speaker, and an autonomous moving body projector that are provided in the autonomous moving body to provide notification that the autonomous moving body will board the car.

2. The autonomous moving body control device according to claim 1, wherein the program further causes the processor to perform:

causing, in response to the hall call from the autonomous moving body being present and a nearest floor at which the car can stop matching a floor on which the autonomous moving body is present, at least one of the autonomous moving body light, the autonomous moving body display, the autonomous moving body speaker, and the autonomous moving body projector that are in the autonomous moving body to provide notification that the autonomous moving body will board the car.

3. The autonomous moving body control device according to claim 1, wherein the program further causes the processor to perform:

causing, in response to the autonomous moving body control device receiving information indicating that boarding is allowed, at least one of the autonomous moving body light, the autonomous moving body display, the autonomous moving body speaker, and the autonomous moving body projector that are in the autonomous moving body to provide notification that the autonomous moving body will board the car.

4. The autonomous moving body control device according to claim 1, wherein the program further causes the processor to perform:

causing, in response to the hall call from the autonomous moving body being present and a door of the car being open on a floor on which the autonomous moving body is present, the autonomous moving body projector in the autonomous moving body to project a boarding position of the autonomous moving body inside the car or a travel path to the boarding position; and move, in a case where the autonomous moving body has started to move, a projection position of the boarding position of the autonomous moving body or the travel path to the boarding position in a direction opposite to a moving direction of the autonomous moving body at a same speed as a travel speed of the autonomous moving body by a same distance as a movement distance of the autonomous moving body.

5. The autonomous moving body control device according to claim 1, wherein the program further causes the processor to perform:

causing, in response to a car call from the autonomous moving body being present and a nearest floor at which the car can stop matching a destination floor corresponding to the car call, at least one of the autonomous moving body light, the autonomous moving body display, the autonomous moving body speaker, and the autonomous moving body projector that are in the autonomous moving body to provide notification that the autonomous moving body will disembark from the car.

6. The autonomous moving body control device according to claim 1, wherein the program further causes the processor to perform:

causing, in response to a car call from a user corresponding to a floor on which the autonomous moving body is present and a nearest floor at which the car can stop matching the floor on which the autonomous moving body is present, at least one of the autonomous moving body light, the autonomous moving body display, the autonomous moving body speaker, and the autonomous moving body projector that are in the autonomous moving body to provide notification that the user will disembark from the car.

7. The autonomous moving body control device according to claim 1, wherein the program further causes the processor to perform:

causing, when in response to the car starting to decelerate toward a floor on which the autonomous moving body is present in response to a hall call from a user, at least one of the autonomous moving body light, the autonomous moving body display, the autonomous moving body speaker, and the autonomous moving body projector that are in the autonomous moving body to provide notification that the user will board the car.

8. The autonomous moving body control device according to claim 1, wherein the program further causes the processor to perform:

causing, in response to the car starting to decelerate toward a destination floor corresponding to a car call from a user, at least one of the autonomous moving body light, the autonomous moving body display, the autonomous moving body speaker, and the autonomous moving body projector that are in the autonomous moving body present inside the car to provide notification that the user will disembark from the car.

9. A computer implemented method of controlling an autonomous moving body, comprising:

measuring, based on a current position and a moving direction of a car, a number of times the car passes a floor on which a hall call was made while traveling in a same direction as that requested by the hall call; and causing, in response to an ordinal number of the number of times the car passes obtained by the measuring corresponding to an ordinal number of round trips that has been stored according to the hall call from the autonomous moving body, at least one of an autonomous moving body light, an autonomous moving body display, an autonomous moving body speaker, and an autonomous moving body projector that are in the autonomous moving body to provide notification that the autonomous moving body will board the car.

10. The method according to claim 9, further comprising:

causing, in response to the hall call from the autonomous moving body is present and a nearest floor at which the car can stop matching a floor on which the autonomous moving body is present, at least one of the autonomous moving body light, the autonomous moving body display, the autonomous moving body speaker, and the autonomous moving body projector that are in the autonomous moving body to provide notification that the autonomous moving body will board the car.

11. The method according to claim 9, further comprising:

causing, in response to the autonomous moving body control device receiving information indicating that boarding is allowed, at least one of the autonomous moving body light, the autonomous moving body display, the autonomous moving body speaker, and the autonomous moving body projector that are in the autonomous moving body to provide notification that the autonomous moving body will board the car.

12. The method according to claim 9, farther comprising:

causing, in response to the hall call from the autonomous moving body is present and a door of the car being open on a floor on which the autonomous moving body is present, the autonomous moving body projector in the autonomous moving body to project a boarding position of the autonomous moving body inside the car or a travel path to the boarding position; and move, in a case where the autonomous moving body has started to move, a projection position of the boarding position of the autonomous moving body or the travel path to the boarding position in a direction opposite to a moving direction of the autonomous moving body at a same speed as a travel speed of the autonomous moving body by a same distance as a movement distance of the autonomous moving body.

13. The method according to claim 9, further comprising:

causing, in response to a car call from the autonomous moving body being present and a nearest floor at which the car can stop matching a destination floor corresponding to the car call, at least one of the autonomous moving body light, the autonomous moving body display, the autonomous moving body speaker, and the autonomous moving body projector that are in the autonomous moving body to provide notification that the autonomous moving body will disembark from the car.

14. The method according to claim 9, further comprising:

causing, in response to a car call from a user corresponding to a floor on which the autonomous moving body is present and a nearest floor at which the car can stop matching the floor on which the autonomous moving body is present, at least one of the autonomous moving body light, the autonomous moving body display, the autonomous moving body speaker, and the autonomous moving body projector that are in the autonomous moving body to provide notification that the user will disembark from the car.

15. The method according to claim 9, further comprising:

causing, in response to the car starting to decelerate toward a floor on which the autonomous moving body is present in response to a hall call from a user, at least one of the autonomous moving body light, the autonomous moving body display, the autonomous moving body speaker, and the autonomous moving body projector that are in the autonomous moving body to provide notification that the user will board the car.

16. The method according to claim 9, further comprising:

causing, in response to the car starting to decelerate toward a destination floor corresponding to a car call from a user, at least one of the autonomous moving body light, the autonomous moving body display, the autonomous moving body speaker, and the autonomous moving body projector that are in the autonomous moving body present inside the car to provide notification that the user will disembark from the car.

* * * * *